J. H. MUMMA.
Straw Cutter.

No. 57,363.  Patented Aug. 21, 1866.

UNITED STATES PATENT OFFICE.

J. H. MUMMA, OF HARRISBURG, PENNSYLVANIA.

IMPROVEMENT IN STRAW-CUTTERS.

Specification forming part of Letters Patent No. 57,363, dated August 21, 1866.

*To all whom it may concern:*

Be it known that I, J. H. MUMMA, of Harrisburg, Pennsylvania, have invented an Improvement in Straw-Cutters; and I do hereby declare the following to be a full, clear, and exact description of the same, reference being had to the accompanying drawings, and to the letters of reference marked thereon.

My invention consists of certain disks having ribs on their inner faces, in combination with adjustable plates secured to the knives of a straw-cutter, the whole being constructed and arranged as fully described hereinafter, so that the knives may be held firmly in their position.

In order to enable others skilled in the art to make and use my invention, I will now proceed to describe its construction and operation.

Figure 1:
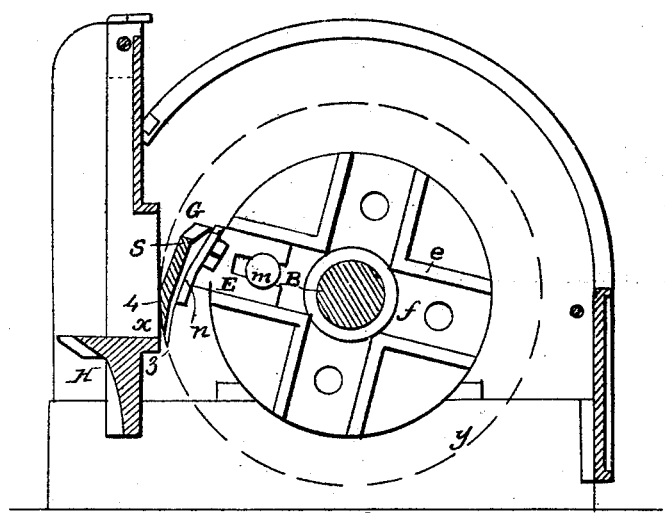
Figure 2:
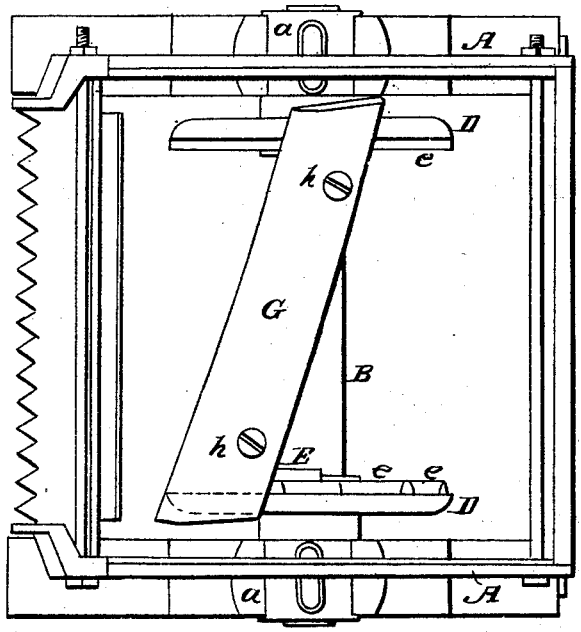

On reference to the accompanying drawings, which form a part of this specification, Figure 1 is a vertical section of sufficient of a straw-cutter to illustrate my improvement, and Fig 2 a plan view of Fig. 1.

B represents the main shaft of a straw-cutter, which is caused to revolve, by any suitable system of gearing, in boxes $a$ $a$ secured to the frame of the machine.

Two metal disks, D and D′, are secured to the shaft B, and on the inside of each disk recesses $f$ are formed, by ribs $e$, for the reception of plates E, there being in the present instance four such recesses for the reception of as many plates. Each plate is so secured by a screw or bolt, $m$, to the disk as to be adjustable thereon to and from the shaft B.

Each plate has a flange, $n$, to which one end of one of the knives G is secured by a set-screw, $h$.

The plates of one disk are so arranged in respect to those of the other, and the knives are so bent, that each knife shall assume the spiral form and direction shown in Fig. 2.

The knives revolve between but free from contact with the usual side plates, A A′, secured to or forming a part of the frame, and above the knives is the usual hinged cover.

H is the bed-plate secured to the frame of the machine, $x$ being the edge between which and that of the knife the straw is cut.

As the gearing for operating the knives, device for feeding the straw to the cutters, and the frame of the machine are similar to those of other straw-cutters, and are familiar to makers of agricultural implements, and as my invention relates especially to the manner of fastening the knives, it has not been deemed necessary to illustrate or describe more of the machine than such as will suffice to explain my invention.

In ordinary machines of this character, where the knives are secured to adjustable plates, the latter are fastened to plain disks by bolts, which in a little while become loosened, so that the knives and plates are moved from their places, and by striking against projecting portions of the machine are greatly damaged.

In the above-described machine the plates E are confined in the recesses $f$ between the ribs $e$ $e$ in such a manner that the ribs sustain the greater portion of the strain. The bolts therefore are not so apt to become loosened, and the knives and plates E are retained firmly in their positions.

I claim as my invention and desire to secure by Letters Patent—

The disks D D′, with their ribs $e$ $e$ and recesses $f$, adapted for the reception of the adjustable plates E, the whole being constructed and arranged substantially as described.

In testimony whereof I have signed my name to this specification in the presence of two subscribing witnesses.

J. H. MUMMA.

Witnesses:
JOHN NEVIN,
OLIVER EDWARDS.